United States Patent [19]

Klang

[11] Patent Number: 5,614,236
[45] Date of Patent: Mar. 25, 1997

[54] BOTTLE CLOSURE FOR COLLECTING AND TRAPPING SEDIMENT

[76] Inventor: Albert Klang, 589 Lefferts Ave., Brooklyn, N.Y. 11203

[21] Appl. No.: 655,380

[22] Filed: May 30, 1996

Related U.S. Application Data

[63] Continuation-in-part of Ser. No. 418,811, Apr. 7, 1995, abandoned.

[51] Int. Cl.$^6$ ..................................................... C12H 1/22
[52] U.S. Cl. .............................. 426/112; 426/8; 426/62; 426/495; 99/277.1; 210/532.1; 215/227; 220/215
[58] Field of Search .............................. 426/8, 62, 112, 426/115, 495; 99/277.1; 215/6, 227; 210/532.1; 220/215

[56] References Cited

U.S. PATENT DOCUMENTS

| 1,744,947 | 1/1930 | Bowman . | |
|---|---|---|---|
| 1,793,048 | 2/1931 | Brigel . | |
| 1,865,023 | 6/1932 | Leavy . | |
| 1,892,884 | 1/1933 | Grauman et al. . | |
| 2,139,961 | 12/1938 | Kleid | 210/57 |
| 2,779,472 | 1/1957 | Febbraro | 210/57 |
| 3,413,128 | 11/1968 | Steinbarth et al. | 99/171 |
| 3,856,169 | 12/1974 | Wilson et al. | 215/6 |
| 4,840,908 | 6/1989 | Burns | 435/296 |
| 4,932,543 | 6/1990 | Martus | 215/6 |
| 4,947,737 | 8/1990 | Gladstone | 99/277.1 |

FOREIGN PATENT DOCUMENTS

| 2582013 | 11/1986 | France . |
| 1934325 | 1/1971 | Germany . |
| 3821512 | 12/1989 | Germany . |
| 1373726 | 2/1988 | U.S.S.R. . |
| 2219307 | 6/1989 | United Kingdom . |

Primary Examiner—Esther Kepplinger
Assistant Examiner—Curtis E. Sherrer
Attorney, Agent, or Firm—Norbert P. Holler

[57] ABSTRACT

A bottle closure for collecting and removing solid sediment particles from a liquid being fermented in situ in a bottle to form an alcoholic beverage. The closure has a skirt portion which is adapted to be removably fastened to the neck of the bottle and terminates at its top end in an inwardly directed annular flange defining a central opening, a tubular trap portion which is closed at its top end and communicates at its open bottom end with the central opening in the skirt flange, and a correspondingly tubular liquid- and gas-tight liner of a sealing material which is disposed in the trap portion and has at its bottom end an outwardly directed annular flange which underlies the skirt flange and is adapted to be pressed by the latter, when the closure is fastened to the neck of the bottle, against the annular sealing surface located at the top end of the bottle. In use, the sealed bottle is inverted so that any sediment settles unobstructedly into the closed end region of the trap portion. When the fermentation is completed, the trap portion is crimped inwardly in its mid-region above the accumulated sediment until the correspondingly crimped liner seals off the section of the trap portion containing the sediment. The bottle can then be turned upright preparatory to being opened without risk of the sediment flowing back into the finished alcoholic beverage in the bottle.

9 Claims, 1 Drawing Sheet

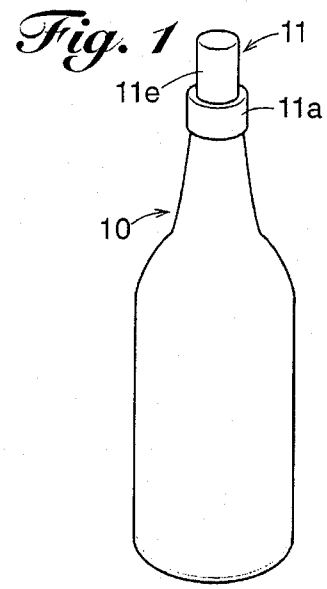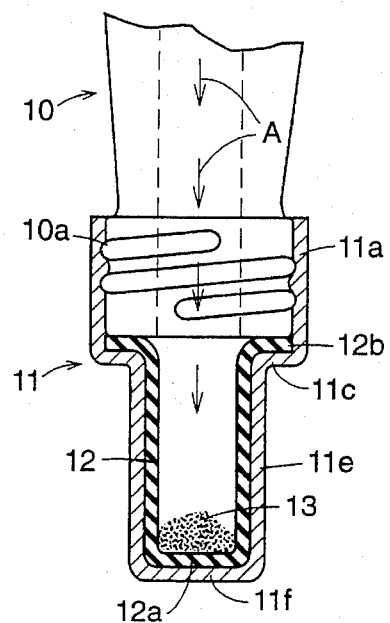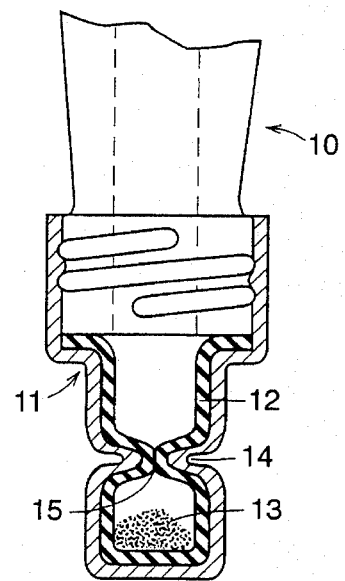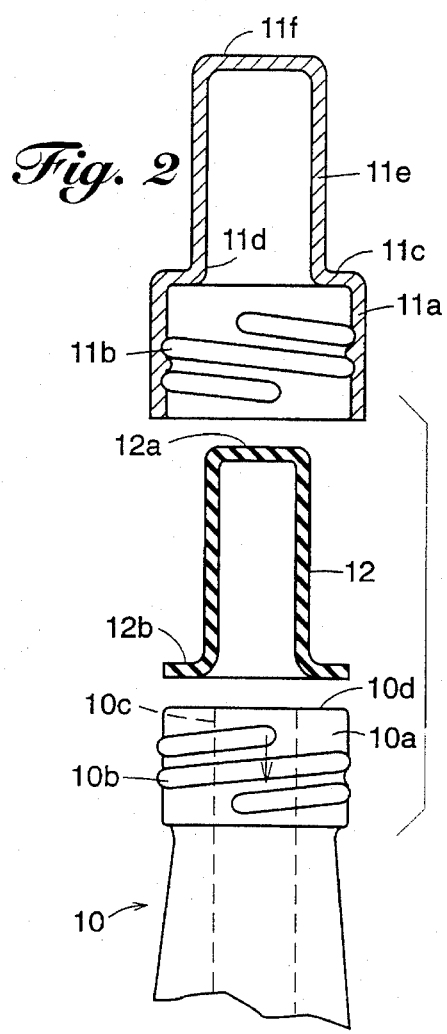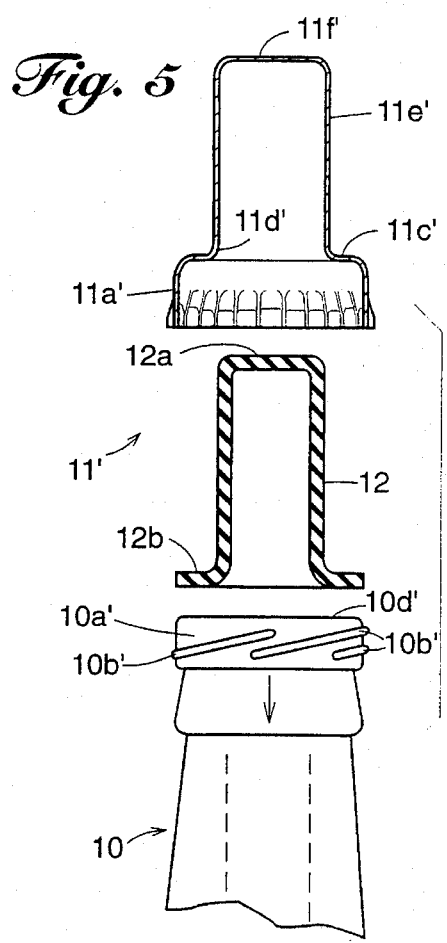

BOTTLE CLOSURE FOR COLLECTING AND TRAPPING SEDIMENT

CROSS-REFERENCE TO RELATED APPLICATION

This application is a continuation-in-part of my prior application Ser. No. 08/418,811 filed Apr. 7, 1995, now abandoned.

BACKGROUND OF THE INVENTION

This invention relates to the art of brewing beer, champagne, and other alcoholic beverages, and in particular to bottle closures for collecting and removing solid sediment particles from a liquid being fermented in situ in a bottle to form an alcoholic beverage.

Home-brewing of beer and other bottle-conditioned alcoholic beverages, i.e., beverages which are fermented, aged and naturally carbonated in the bottle, is a long-established and well known art. In the fermentation process used in preparing such beverages, a sediment (e.g., yeast particles) settles at the bottom of the bottle. In order to remove this sediment, which is necessary to properly clarify the liquid, various methods have heretofore been employed.

In the case of champagne making, for example, the bottle is usually inverted or turned upside down to allow the sediment to collect in the tip region of the neck of the bottle. The bottle neck is then placed in a freezing brine solution until the liquid in the tip region is frozen solid. The bottle is then warmed slightly to loosen the frozen sediment plug, after which the bottle cap is removed and the pressure of the natural carbonation blows the sediment plug out of the bottle. The bottle is then recapped. This method, however, is complicated and time-consuming.

In the case of home-brewed beer, by way of another example, if the sediment has not yet been removed at the time the beer is to be consumed, the beer is poured carefully into a glass in one motion until the sediment begins moving from the bottom of the bottle. A problem with this approach is that it is aesthetically undesirable to drink or to serve guests a beverage which has an unappetizing deposit sitting on the bottom of the bottle or which has become turbid in the glass as the liquid was being poured into the glass. To avoid this possibility, it is necessary to handle the bottle very carefully so as not to agitate the liquid and stir up the sediment, but that requires a great deal of concentration as well as a steady hand and is also very slow.

Still further, some more sophisticated home-brewers have adopted the method, usually used by commercial breweries, of filtering the brew. Unfortunately, however, filtration removes flavor constituents of the brew along with the yeast and also shortens the shelf life of beer.

Various attempts to overcome and avoid these problems have been made in the past. For example, U.S. Pat. No. 1,865,023, U.S. Pat. No. 1,892,884, U.S. Pat. No. 2,139,961, U.S. Pat. No. 3,856,169, U.S. Pat. No. 4,947,737 and U.S. Pat. No. 4,932,543 and German Patent No. 3,821,512, all disclose various types of bottle closures designed for use in cases where the bottle is stored in an inverted or upside down state during the fermentation stage. All of these bottle closures, however, suffer from one or more of a variety of drawbacks. Many are provided with various types of valve-like devices to seal off the accumulated sediment particles in the cork or stopper and thus are relatively complex structures, the more so where they are designed for reuse and thus necessitate frequent cleaning and maintenance.

Moreover, in these known arrangements access to the sediment-containing parts of the cork or stopper requires the yeast particles, as they settle from the liquid in the inverted bottle into the cork or stopper thereof, to pass one or more generally transverse surfaces (i.e., surfaces which are not substantially vertical) which to some extent constitute obstructions to the path of movement of the settling yeast particles. Here it must be understood that the nature of a flocculating yeast sediment is such that as it is settling through the liquid it will accumulate on anything in its path which is not a vertical or almost vertical surface. As the result of such a sediment buildup, therefore, those portions of the sediment which have come to rest on the obstructive surfaces within the stopper and have not reached the bottom of the trap section of the stopper and have not been removed from the stopper will end up falling off those surfaces and being returned into the beverage when the bottle is returned to its upright state and thus will make the liquid turbid and will nullify the benefit of collecting the sediment in the stopper.

Yet another sediment-removing system utilizing an inverted bottle arrangement for the fermentation stage is disclosed in U.K. Pat. No. 2,219,307. In this system, during the fermentation stage a smaller bottle for receiving the sediment is suspended from an inverted larger bottle through the intermediary of a flexible tube which is connected to two terminal connectors that are in turn screwed onto the respective necks of the two bottles. The system is disadvantageous, however, in several respects. One disadvantage is that the junctions between the flexible tube and the bottle necks are subject, by virtue of the internal pressure rise due to the fermentation process and by virtue of the weight of the lower bottle and its contents, to leakage unless appropriate countermeasures (for example, the patent mentions the provision of clips where the tube joins the connectors) are taken. Another disadvantage is that the disconnection of the smaller bottle from the larger one at the end of the fermentation stage is time-consuming and cumbersome, in that first the larger bottle must be raised from its storage rack together with the smaller bottle and must then be restored to its upright state by folding the flexible tube while the smaller bottle remains upright, at which point the tube and its connectors must be disconnected from the bottles to permit the larger one to be capped and the smaller one to be cleaned out. Still another disadvantage is that each fermentation cycle results in an economic loss, in that a considerable amount of the fermenting liquid originally contained in the larger bottle (an amount essentially equal to the volume of the smaller bottle plus about one half the volume of the flexible tube) has to be dispensed and is lost with the sediment.

Other approaches have been suggested for carrying out "in the bottle" fermentations while the bottles are stored in an upright state. Such approaches have entailed the provision of sediment traps at the bottoms of the bottles, as is disclosed, by way of example, in U.S. Pat. No. 1,744,947 and U.S. Pat. No. 2,779,472. Bottles of this type are expensive and difficult to manufacture, however, and are highly susceptible to breakage in the regions of the traps.

BRIEF DESCRIPTION OF THE INVENTION

It is the primary objective of the present invention to provide a sediment-collecting and -trapping bottle closure to be used in the fermentation of liquids in bottles, e.g., beer, champagne, etc., which closures are extremely simple in construction, are easy and inexpensive to manufacture, are intended for only a one-time use, and can be disposed of after they have been used without any risk of spillage of the entrapped sediment and liquid while eliminating all need for cleaning and maintenance.

It is another object of the present invention to provide such sediment-collecting and -trapping bottle closures which permit the use of assembly line techniques for production of the closures as well as for the pre-fermentation capping of bottles therewith and the post-fermentation crimping thereof to permanently entrap the collected sediment.

To enable these objectives of the invention to be achieved, the present invention contemplates the provision of a bottle closure which has a skirt portion and a trap portion both preferably made of the same material as parts of a one-piece structure, and a liner for the interior of the closure preferably made of a suitable sealing material. It will be understood, in this regard, that the skirt and trap portions of the closure will generally be made of a metallic material, but they may also be made of partly or fully non-metallic materials having the required physical properties. The liner, on the other hand, will generally be made of a synthetic plastic or rubbery material which is both non-toxic and capable of serving as a sealant, i.e., which is impervious to liquids and gases; a preferred material of this type is low density polyethylene (LDPE).

More particularly, the skirt portion of the closure, which may, for example, be of the screw cap type or of the twist-off crown cap type and is adapted to be removably exteriorly fastened to the neck of a bottle, terminates at its top end in an annular inwardly directed flange the radial width of which is approximately the same as (actually slightly less than) the radial width of the top end sealing surface of the bottle and which defines a central opening at the top end of the skirt portion. The trap portion preferably is a tubular structure about 3 cm in axial length which extends upwardly from the inner boundary edge of the inwardly directed skirt flange, the trap portion being closed at its top end and having its bottom end open and in communication with the interior of the skirt portion through the central opening in the skirt flange. The liner which, like the trap portion of the closure, is a tubular structure which is closed at its top end and open at its bottom end, is provided at its bottom end with an annular outwardly directed flange which, when the tubular part of the liner is located within the tubular trap portion, underlies the inwardly directed flange of the skirt portion and thus is in a position to be pressed by the skirt flange against the sealing surface of the bottle when the closure is fastened to the bottle neck. The interior diameter of the tubular portion of the liner is such that when the liner is in position within the tubular trap portion of the closure, the inner surface of the liner is essentially in alignment with the inner surface of the bottle neck. The liner may be a separate molded structure which is adapted to be inserted as such into the closure, but alternatively it may also be in the form of a layer cast, drawn or molded directly into the closure.

In use, after the bottle has been filled with the liquid to be fermented, a closure as described is fastened to the bottle neck so that the flange of the liner is compressed between the flange of the skirt portion and the sealing surface of the bottle to provide a liquid-tight and gas-tight seal for the bottle. The sealed bottle is then inverted and stored in its upside down state until the yeast sediment has settled to the floor of the cap constituted by the closed top end of the trap portion and the closed top end of the liner located within the same, during which time the settling yeast does not encounter any obstructing surface in the continuous passageway constituted by the interior of the bottle neck and the interior of the trap portion of the closure until it has reached its destination at the closed end of the trap portion of the closure. When the fermentation stage has been completed, the trap portion of the closure is transversely crimped in its mid-region at a location somewhat above the top of the accumulated mass of sediment, until the section of the liner at that location has been pressed together sufficiently to establish a full liquid-impervious seal interiorly of the trap portion. The bottle can then be returned to its upright position for as long as desired without any risk of the accumulated sediment flowing back down into the fermented liquid, while the contents of the bottle remain unvented to the ambient atmosphere. Upon the bottle then being opened through removal of the closure by a prospective drinker of the beverage, the finished alcoholic beverage can be decanted from the bottle into a glass or other drinking vessel without generating any turbidity in the glass. The closure is, of course, disposed of with its contents.

BRIEF DESCRIPTION OF THE DRAWINGS

The foregoing and other objects, characteristics and advantages of the present invention will be more clearly understood from the following detailed description thereof when read in conjunction with the accompanying drawing, in which:

FIG. 1 is a front perspective view of a bottle in its upright position and having a screw cap type of closure according to the present invention fastened thereto;

FIG. 2 is an exploded partly sectional view of the bottle and closure shown in FIG. 1;

FIG. 3 is a fragmentary partly sectional view of the closed bottle in its inverted state and illustrates the accumulation of sediment in the lined trap portion of the closure;

FIG. 4 is a view similar to FIG. 3 but shows the trap portion deformed or crimped inwardly to press the liner into the form of a liquid-impervious seal isolating the section of the trap where the sediment is accumulated from the remainder of the bottle; and FIG. 5 is an exploded partly sectional view of a bottle and a twist-off crown cap type of closure according to a modified embodiment of the present invention.

DETAILED DESCRIPTION OF THE INVENTION

Referring now to the drawing in greater detail, a fermentation bottle 10 having a neck 10a and a sediment-trapping closure 11 according to one embodiment of the present invention fastened thereto is shown in FIGS. 1 and 2, and a bottle with a similar closure 11' is shown in FIG. 5. The closure 11 includes a skirt portion 11a which is shown as having a screw cap configuration by virtue of being internally threaded at 11b in a manner corresponding to the external threading 10b of the bottle neck 10a, and in like manner the closure 11' includes a skirt portion 11a' which is shown as having a "twist-off" crown cap configuration with an internal multiple thread system corresponding to the external multiple thread system 10b' of the bottle neck 10a'. In all other respects, the closures 11 and 11' are identical. Thus, in each case the skirt portion 11a of the closure 11 or the skirt portion 11a' of the closure 11' is provided at its top end with an annular inwardly directed flange 11c or 11c' which defines a central opening 11d or 11d' generally corresponding in diameter to but being very slightly larger in diameter than the bottle neck opening 10c, and with a tubular trap portion 11e or 11e' which extends upwardly from the inner periphery of the skirt flange 11c or 11c' and is closed at its top end 11f or 11f' and open at its bottom end in communication with the central opening 11d or 11d'. Located internally of the tubular trap portion 11e or 11e' is a correspondingly tubular liner 12 which is closed at its top end 12a and open at its bottom end where it is provided with an annular outwardly directed flange 12b.

The arrangement in each case is such that when the liner 12 is in position within the closure 11 or 11' the inner surface of the tubular portion of the liner is essentially in alignment with the inner surface 10c of the bottle neck, the closed top end 12a of the liner lies against the closed top end 11f or 11f' of the trap portion, and the outwardly directed liner flange 12b underlies the inwardly directed skirt flange 11c or 11c'. Thus, when the closure 11 or 11' is fastened to the respective bottle neck 10a or 10a' (see FIGS. 3 and 4), the liner flange 12b is compressed (not shown as such) and flattened between the skirt flange 11c or 11c' and the annular sealing surface 10d or 10d' which surrounds the neck opening at the top end of the bottle. This provides the requisite liquid-tight and gas-tight seal for the bottle and at the same time ensures that the inner surface of the bottle neck opening 10c and the therewith aligned inner surface of the tubular portion of the liner 12 within the trap portion 11e or 11e' of the closure 11 or 11' constitute an essentially continuous boundary of a smooth-walled passageway unobstructed by any transverse surface.

In use, as previously indicated, when the bottle is filled with the liquid to be fermented, the closure 11 or 11' is applied and fastened to the bottle neck in exteriorly surrounding relation thereto, and the bottle is then inverted and stored in an upside down condition (see FIG. 3). By virtue thereof, the sediment 13 generated in the fermenting liquid settles, as indicated by the arrows A, into the interior of the tubular trap portion 11e or 11e' of the closure through the unobstructed passageway defined by the interior of the bottle neck and the tubular portion of the liner within the trap portion of the closure, and accumulates at the floor of the trap portion within the confines of the liner. At the completion of the fermentation stage and before the bottle is returned to its upright state, the trap portion 11e or 11e' of the closure is transversely, i.e., circumferentially or laterally, crimped inwardly, as indicated at 14 in FIG. 4, so that the section of the liner 12 at the level of the crimping is pressed together so as to form a liquid-impervious and gas-impervious seal 15 across the interior space of the trap portion. This effectively isolates the quantity of sediment 13 accumulated in the lower section of the trap portion from the remainder of the liquid in the bottle. When the bottle is then turned back to its upright state, the sediment remains trapped in the sealed-off end region of the closure and cannot flow back into the liquid in the bottle. The advantage accruing from this feature is that the closure 11 or 11' can be left in place as long as desired, i.e., until a consumer is ready to drink the beverage, and can then be safely unscrewed or untwisted from the bottle to permit the consumer to decant the finished alcoholic beverage from the just-opened bottle into a glass or other drinking vessel without the creation of any turbidity in the liquid in the glass. After its removal, of course, the closure with the trapped sediment still confined therein is simply discarded and not reused.

Other advantages of the present invention than those already mentioned hereinabove will also be readily apparent from the preceding description. Thus, the "Crimp-Cap" bottle closures of the present invention are easy to manufacture, being fully capable of assembly line production. Moreover, the capping of the liquid-filled bottles with such "Crimp-Cap" closures preparatory to the start of the fermentation stage can also be done on an assembly line basis by standard bottle-capping machines which need to be modified only to render their cap-gripping heads adapted to accommodate the tubular trap-constituting portions of the closures according to the present invention. Still further, even the transverse crimping of the trap portions of these closures while the associated bottles are still in their inverted states can be effected by automated machinery. The production of such closures as well as the sediment-isolation and removal stages thereof thus are considerably less labor-intensive and less complicated, and hence less costly, than are the production and use of any known sediment-trapping closures.

It will be understood that the foregoing description of the present invention is for purposes of illustration only and that the various structural and functional features and relationships disclosed herein are susceptible to a number of changes and modifications none of which entails any departure from the spirit and scope of the present invention as defined in the hereto appended claims.

I claim:

1. A bottle closure for collecting and removing solid sediment particles from a liquid being fermented in situ to form an alcoholic beverage in a bottle having a neck which defines a neck opening bounded by an inner surface of said neck and terminates in an annular sealing surface surrounding said neck opening, said closure comprising:

a skirt portion having an open bottom end and a top end and being adapted to be removably fastened to the bottle neck in exteriorly surrounding relation thereto, said skirt portion terminating at said top end thereof in an inwardly directed annular flange having a radial width approximately corresponding to the radial width of said sealing surface of the bottle neck and defining a central opening generally corresponding in size to said neck opening of the bottle;

a trap portion extending upwardly from said inwardly directed annular flange of said skirt portion and having a tubular portion with an inner surface, a closed top end, and an open bottom end communicating with said central opening in said inwardly directed annular flange of said skirt portion, said tubular portion of said trap portion being adapted to be transversely crimped inwardly at a location between its top and bottom ends; and a liquid-tight and gas-tight liner of sealing material located within said trap portion, said liner having a tubular portion with an inner surface which is concentric with said inner surface of said tubular portion of said trap portion, a closed top end which underlies said closed top end of said trap portion, and an open bottom end bounded by an outwardly directed annular flange which underlies said inwardly directed annular flange of said skirt portion, said outwardly directed annular flange of said liner being adapted to be pressed by said inwardly directed annular flange of said skirt portion against said sealing surface of the bottle neck when said closure is fastened to the bottle neck;

whereby, when a bottle containing a fermenting liquid and sealed by said closure is stored in an upside down position, said inner surface of said tubular portion of said liner and said inner surface of said bottle neck constitute an essentially continuous passageway which is unobstructed by any transverse surface, and sediment particles are able to pass through said passageway without encountering any obstructing surface so as to enter freely and accumulate in the closed end region of said trap portion, and said sediment particles ultimately become trapped in said closed end region of said trap portion when said tubular portion of said trap portion is transversely crimped inwardly to an extent sufficient to cause the simultaneously crimped section of said tubular portion of said liner to form a liquid-impervious and gas-impervious seal across the interior of said trap portion, thereby precluding return of the sediment particles into the liquid in the bottle when the latter is returned to an upright position preparatory to said closure being removed from the bottle for dispensing of the finished alcoholic beverage.

2. A bottle closure as claimed in claim 1, wherein said skirt portion is internally threaded in the manner of a screw cap and is adapted to be exteriorly fastened to the bottle neck by being screwed onto a correspondingly externally threaded region of the bottle neck.

3. A bottle closure as claimed in claim 1, wherein said skirt portion is internally multiple threaded in the manner of a "twist-off" crown cap and is adapted to be exteriorly fastened to the bottle neck by being "twisted" onto a correspondingly externally multiple-threaded region of the bottle neck.

4. A bottle closure as claimed in claim 1, wherein said trap portion is substantially cylindrical in configuration.

5. A bottle closure as claimed in claim 4, wherein said trap portion is about 3 cm in axial length.

6. A bottle closure as claimed in claim 1, wherein said skirt portion and said trap portion are integral parts of a one-piece closure structure.

7. A bottle closure as claimed in claim 1, wherein said liner is a separate structure made of said sealing material and separately inserted into said trap portion.

8. A bottle closure as claimed in claim 1, wherein said liner is constituted by a layer of said sealing material drawn, cast or molded into place in said trap and skirt portions.

9. A bottle closure as claimed in claim 1, wherein said sealing material of which said liner is made is low density polyethylene.

\* \* \* \* \*